March 16, 1965 H. C. LINQUIST 3,173,358
BARBEQUE APPARATUS
Filed Dec. 17, 1962
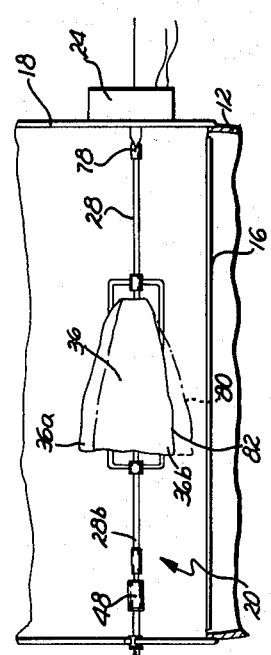
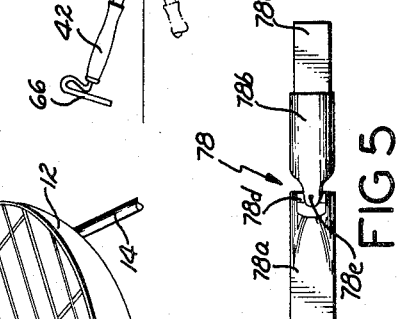
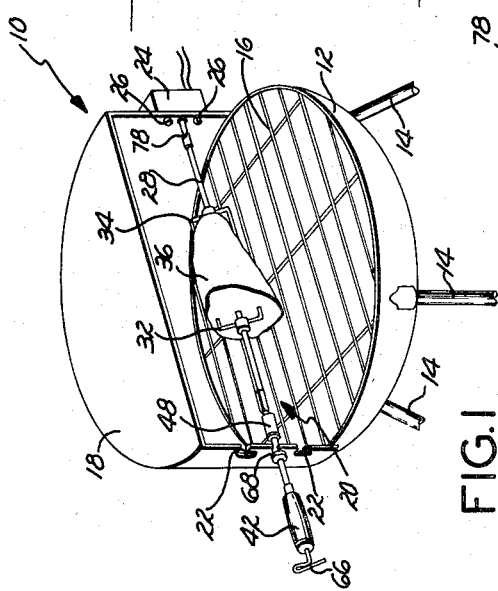
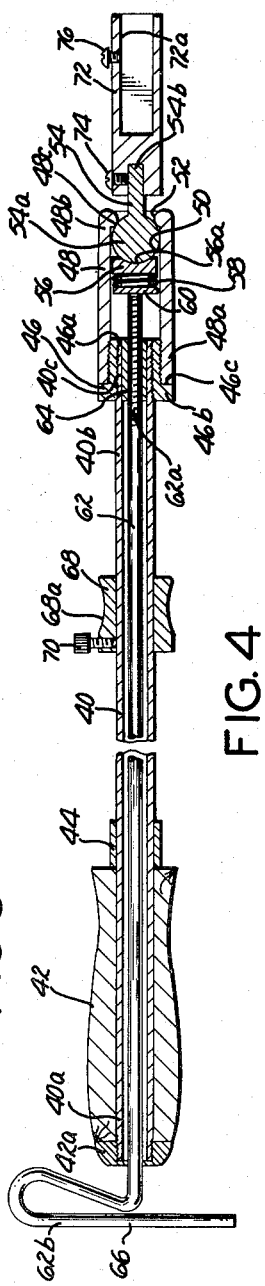
INVENTOR.
HERBERT C. LINQUIST
BY
ATTORNEY United States Patent Office 3,173,358
Patented Mar. 16, 1965

3,173,358
BARBEQUE APPARATUS
Herbert C. Linquist, 11692 S. Walnut, Orange, Calif.
Filed Dec. 17, 1962, Ser. No. 244,977
2 Claims. (Cl. 99—421)

The present invention relates generally to barbeque apparatus, and more particularly to means for applying a given amount of heat to all portions of the food being cooked.

During the past several decades barbequing has enjoyed increasing popularity to a point where today practically every family in the United States owns barbeque equipment. Many changes have taken place within recent years with respect to the construction and operation of such equipment. As a result, many different cuts of meat, fish, vegetables and other eatable foods can be prepared, as desired, by the householder in his rear yard or on his patio.

Many different types of accessories are now available for use with the usual barbeque equipment. Such accessories are in the form of baskets or holders for containing some of the smaller pieces of meat and vegetables, and pointed devices of various types and designs for piercing the food to thereby retain the same in a given position over the bed of hot coals.

For the purpose of holding and turning over the source of heat large pieces of food such as meat to be cooked, there has been provided an elongated rod one end of which is ground to form a point. Such rods are referred to as barbeque spits and are forcibly inserted into the large sections or pieces of meat. Thereafter, suitable fork devices are mounted on the barbeque spit to hold the meat in a fixed position thereon. One particular shortcoming of spits as heretofore constructed and operated, has been the difficulty in properly inserting the spit in the precise center of the piece of meat. As a result, the piece of meat is frequently off-center and, in addition to impairing the rotating operation, has resulted in one portion of the meat being moved along a path closer to the source of heat than other portions thereof. Thus, the piece of meat frequently is not cooked evenly since one portion thereof receives considerably more heat than the rest.

It is an object of the present invention to provide barbeque apparatus having holding means which is adjustable to compensate for any misalignment between the food and the holding means therefore.

Another object of this invention is to provide barbeque apparatus having means which can be adjusted after the meat or other food to be cooked has been placed on the barbeque spit.

A further object of the present invention is to provide barbeque apparatus having a spit provided with a universal connection for offsetting the spit as desired to align the center of the meat thereon with the axis of rotation of the spit.

Another object of the present invention is to provide barbeque apparatus as characterized above which comprises power operated rotating means.

Another object of this invention is to provide barbeque apparatus having adjustable food holding means as characterized above wherein the direction and amount of offset can be varied from a remote location removed from the source of heat.

Another object of the present invention is to provide barbeque apparatus as characterized above having a universal joint between the barbeque spit and the power operated drive means to enable the drive means to be operated in a fixed position regardless of the direction or amount of offset of the spit.

Another object of the present invention is to provide barbeque apparatus as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a perspective view of barbeque apparatus provided with holding means according to the present invention;

FIGURE 2 is a fragmentary sectional view of the apparatus of FIGURE 1;

FIGURE 3 is a view similar to FIGURE 2, and shows the adjustable spit in offset position;

FIGURE 4 is a longitudinal sectional view through a portion of the meat or food holding device; and FIGURE 5 is an enlarged elevational view of the universal connector of FIGURE 3.

Like reference numerals indicate corresponding parts throughout the several views of the drawings.

Referring to FIGURE 1 of the drawings, there is shown therein barbeque apparatus identified generally with the numeral 10. Such apparatus may take any one of various different forms and styles within the scope of the present invention. However, common to all barbeque apparatus is the fire bowl 12 for containing the bed of coals as a source of heat, support means therefor which may take the form of support legs 14, and a grate 16 positioned over the bed of hot coals.

Most barbeque apparatus includes a hood 18 which partially envelops the cooking area of the apparatus over the grate 16 and serves several different functions. Firstly, hood 18 acts as a shield for preventing the wind from disturbing the heat source and from needlessly circulating the ash formed thereon by the burning process. Also, hood 18 provides an enclosure which retains the heat afforded by the hot coals and reflects the same onto the meat or other food being cooked on the apparatus.

Almost without exception, the hoods for barbeque apparatus are provided with suitable supports for rotatably supporting meat or food holding means 20. Such supports may take the form of one or more cutouts 22 in the side wall of hood 18 at one end of the food holding means. The other end of the holding means is supported by power operated rotating means 24 which may comprise an electric motor. Suitable openings 26 are formed in the side wall of hood 18 to afford access to the motor 24.

As is well understood, a bed of hot coals is provided within the fire bowl 12 and the meat or other food to be cooked thereby is supported in heating relation to such coals. Also, by means of the electric motor 24, the food is rotated with respect to the fire.

Although frequent reference is made throughout this specification and the appended claims to meat as the food to be cooked on the barbeque apparatus, it is well understood that the subject invention is usable in cooking substantially any type of food. To that extent, the use of the word meat is intended to include all foodstuffs to be positioned on rotating means so as to be cooked on the barbeque apparatus.

The meat holding apparatus 20 is in the form of a barbeque spit which comprises a spit member 28 and a mounting member 30. Spit member 28 is a rod having a substantially square cross section, one end 28a of which is ground to provide a relatively sharp point for insertion into the meat. Not infrequently, such barbeque spits are plated with nickel, chromium or other similar metal to provide a relatively smooth, clean surface therefor.

Adjustably positioned on spit member 28 are a pair of fork members 32 and 34 in opposed relation on opposite sides of a piece of meat 36. Each of the fork members 32 and 34 is provided with a pair of tines or prongs to be imbedded in the meat. Each of such members is also formed with a central hub or collar as shown at 32a and 34a respectively, such collars being formed with a square through opening for receiving the spit member 28. Suitable fastening means (not shown) is usually provided on the collars 32a and 34a whereby the fork members can be firmly secured to the spit member to form a unitary structure therewith.

The mounting member 30 comprises a tubular member 40 having a threaded end portion 40a as shown most clearly in FIGURE 4 of the drawings. A handle member 42 formed of any appropriate material such as wood, metal, plastic or the like, is mounted on end portion 40a of tubular member 40, there being a threaded collar 42a on the end of handle member 42 for threaded engagement with the tubular member 40. A sleeve 44 may be mounted on tubular member 40 to retain handle member 42 in stationary relation to tubular member 40, if desired and necessary.

The opposite end 40b of tubular member 40 is formed with fastening threads 40c for receiving a mounting collar 46. Such collar is formed with internal fastening threads 46a for cooperation with the fastening threads 40c, and is provided with an enlarged annular end portion 46b to provide an anular shoulder 46c.

A socket member 48 is mounted on collar 46; the end portion 48a of said socket member firmly abutting the annular shoulder 46c. The opposite end 48b of member 48 is formed with a socket 50 as a result of an inwardly extending annular shoulder 48c on member 48. Although such annular shoulder can be provided merely by inwardly crimping the annular end of socket member 48, it is also contemplated within the scope of the invention that substantially any other means may be employed for forming a semispherical socket having an opening as shown at 52.

Mounted within socket 50 is one end 54a of a connecting member 54. End 54a is spherically shaped to provide a ball of such size as to rotatably fit within the socket 50. Such arrangement provides a ball and socket universal connection whereby the spherical end portion 54a of connecting member 54 is prevented from leaving socket 50 by means of the inwardly extending annular flange 48c.

Forming the rear portion of socket 50 is a movable wall member 56 which is provided with an arcuate surface 56a of such size and contour as to match the outer surface of end portion 54a of connecting member 54.

Mounted adjacent such movable wall member 56 is spring means 58 which may take the form of a helical compression spring, or may comprise a plurality of individual spring members. A back-up plate or abutment member 60 is positioned adjacent the spring means 58.

For controlling the effect of spring means 58 in urging movable wall member 56 against the spherical end portion 54a of connecting member 54, there is provided an elongated rod 62 within tubular member 40. A sleeve 64 is press-fitted within the end portion 40b of tubular member 40 and is provided with internal fastening threads for cooperating with fastening threads formed on end portion 62a of rod 62.

The opposite end 62b of member 62 is reversely bent as shown in FIGURE 4 to provide a handle 66 for manual rotation of actuating rod 62 as will hereinafter be explained in detail. Collar 42a of handle member 42 can be used as a bearing member for maintaining rod 62 properly positioned within tubular member 40.

A cylindrical shaped bearing member 68 is secured to tubular member 40 by a set screw 70. Bearing member 68 is formed with an arcuately shaped cylindrical surface 68a for cooperation with the cutouts 22 formed in hood 18 as will hereinafter become more apparent.

Connecting member 54 is provided with an end portion 54b which fits within a corresponding opening in a connecting link 72 as shown in FIGURE 4. A set screw 74 is provided for firmly holding end portion 54b within such opening. The other end of link 72 is formed with a substantially square opening 72a for receiving the end of spit member 28. A lock screw 76 is provided in link 72 for firmly holding spit member 28 therewithin.

The pointed end 28a of spit member 28 is mounted within a universal connector 78. Such universal connector is provided with a first member 78a formed with a square opening for receiving spit member 28, and a second member 78b which is provided with an extension 78c which is substantially square in cross section for insertion within correspondingly shaped rotating means in motor 24. Each of the members 72a and 78b is formed with a pivot pin as shown as 78d and 78e, said pins being connected together at right angles to provide a universal joint as will hereinafter become more apparent.

The structure shown in the drawings operates generally as follows.

Firstly, the piece of meat 36 or other foodstuff to be cooked is mounted on the spit member 28. This is accomplished by manually forcing member 28 through the meat. Throughout this operation, every effort should be made to align the barbeque spit with the center of the piece of meat. This is extremely difficult to accomplish. As a result, as shown in FIGURES 1, 2, and 3 of the drawings, the meat 36 frequently is offset to one side of the spit member 28.

Heretofore, when this has occurred it has been necessary remove the spit member and again insert it into the meat, hoping to rectify the initial errors which resulted in the meat being offset or out of balance with respect to the spit member.

With the present invention, the meat 36 is permitted to remain in the offset position, the fork members 32 and 34 being inserted from opposite sides as shown in the drawings. Such fork members are then secured in place so that the meat is firmly attached to the spit member.

Thereafter, the pointed end 28a of spit member 28 is inserted into the square opening of member 78a of universal connector 78. With the member 78b thereof firmly attached to the rotating portion of motor 24, the other end 28b of spit member 28 is inserted into the square opening 72a of connecting link 72. The set screw 76, of course, is then secured against the spit member 28 to retain the same in such position.

The mounting member 30 is then positioned with the cylindrically shaped member 68 in one of the supports 22 formed in hood 18, as generally shown in FIGURE 2. The ball and socket connection between the spit member 28 and the mounting member 30 is adjusted, as will hereinafter be explained in detail, such that members 28 and 30 are coaxially arranged.

While the spit assembly 20 is thus positioned, manual rotation thereof will readily indicate the amount and direction of misalignment between the spit member 28 and the center of the piece of meat 36. That is, as shown in FIGURE 2 of the drawings, mere rotation of the spit assembly will show that the portion 36a of the meat passes closer to the grate 16, as shown by the broken line 80, than will the portion 36b thereof. The closest portion 36b will come to grate 16 is shown by line 82.

If this misalignment between the center of rotation of the spit assembly and the center of the piece of meat 36 is permitted during cooking of the meat, it would soon become evident that the portion 36a would receive considerably more heat than the portion 36b. As a result, markedly different degrees of doneness will be obtained in the one piece of meat. This, of course, is undesirable.

To compensate for the aforedescribed misalignment, it is merely necessary for the operator of the apparatus to manually rotate handle 66 so as to minimize the force of spring means 58 on the movable wall member 56 of the socket 50. Thus, if the fastening threads on end portion 62a of rod 62 are right hand threads, counterclockwise rotation of handle 22 will move the rod 62 to the left as viewed in FIGURE 4. After the major portion of the force of spring means 58 has been removed from the movable wall member 56, the spherical end portion 54a of connecting member 54 will freely move within socket 50. Since the ball and socket connection afforded by spherical end portion 54a and socket 50 is of a universal nature, the mounting member 30 and spit member 28 can be offset in any angular direction and to any desired extent as shown most clearly in FIGURE 3 of the drawings. Thus, by offsetting the spit member 28 and mounting member 30 so as to move the portion 36b of the meat 36 closer to the grate 16, condition can be provided whereby the axis of rotation of the spit assembly, as defined by the support 22 in hood 18 and the rotating member of motor 24, can be aligned with the center of the piece of meat.

After such alignment has been effected, the handle 66 is rotated clockwise to thereby force the movable end wall 56 into firm engagement with the spherical end portion 54a of connecting member 54. The spherical end portion 54a is thus "locked" in the socket 50, in engagement with the inwardly extended annular flange 48c and the wall member 56.

In the aforedescribed manner, the angular offset between the spit member 28 and the mounting member 30 is firmly fixed. Thereafter, operation of motor 24 will rotate the piece of meat 36 over the bed of hot coals within fire bowl 12, all of the external surface of such piece of meat being a fixed distance from the heat source throughout such rotation. In this manner, the piece of meat 36 is cooked to the proper degree of doneness throughout every portion thereof.

As will be readily apparent to those persons skilled in the art, the piece of meat 36 can be easily removed from the spit member 28 by removing the spit assembly 20 from the hood 18 and thereafter removing one or both the fork members 32 and 34.

It is thus seen that the present invention provides barbeque apparatus whereby foodstuff to be cooked can be properly positioned with respect to the source of heat so that the proper degree of doneness is provided.

Although I have shown and described certain specific embodiments of my invention, I am fully aware that many modifications thereof are possible. My invention, therefore, is not to be restricted except insofar as is necessitated by the prior art and by the spirit of the appended claims.

I claim:
1. Adjustable meat holding apparatus for use with barbeque equipment having a bed for coals, a support relative thereto and power operated rotating means in opposed relation to said support comprising in combination, a spit for retaining a piece of meat in fixed position thereon, a mounting member rotatably mounted on said support having an end portion in opposed relation to one end of said spit, pivotal connection means interconnecting the opposed end portions of said spit and said mounting member for aligning the same and for varying as desired the direction and amount of angular offset from such alignment. means for selectively rendering said pivotal connection means rigid in any of its positions of alignment or offset, and a universal connector fixed to said rotating means and to the other end of said spit to permit said rotating means to rotate said spit and support member regardless of the direction and amount of said angular offset.

2. Adjustable meat holding apparatus according to claim 1 wherein said pivotal connection means comprises a ball and socket joint whereby any portion of the surface of the piece of meat on said spit can be moved closer to said bed.

References Cited by the Examiner
UNITED STATES PATENTS 971,827  10/10  Christoph _____ 287—12 X
2,477,183  7/49  Humensky _____ 99—421

FOREIGN PATENTS 316,124  11/56  Switzerland.

ROBERT E. PULFREY, *Primary Examiner.*
JEROME SCHNALL, *Examiner.*